(12) United States Patent
Bartov et al.

(10) Patent No.: US 11,102,746 B2
(45) Date of Patent: Aug. 24, 2021

(54) POSITIONING SYSTEM

(71) Applicant: Rosemount Inc., Shakopee, MN (US)

(72) Inventors: Avishai Bartov, Hod-Hasharon (IL); Yossi Zlotnick, Ramat-Hasharon (IL)

(73) Assignee: ROSEMOUNT INC., Shakopee, MN (US)

( * ) Notice: Subject to any disclaimer, the term of this patent is extended or adjusted under 35 U.S.C. 154(b) by 0 days.

(21) Appl. No.: 15/416,017

(22) Filed: Jan. 26, 2017

(65) Prior Publication Data

US 2017/0135063 A1 May 11, 2017

Related U.S. Application Data

(63) Continuation-in-part of application No. 14/493,730, filed on Sep. 23, 2014, now Pat. No. 9,557,402.

(Continued)

(51) Int. Cl.
*H04W 64/00* (2009.01)
*H04W 56/00* (2009.01)
(Continued)

(52) U.S. Cl.
CPC ......... *H04W 64/003* (2013.01); *G01S 5/0257* (2013.01); *G01S 5/14* (2013.01);
(Continued)

(58) Field of Classification Search
CPC . H04M 2250/12; H04W 88/02; H04W 88/06; H04W 88/08; H04W 64/00;
(Continued)

(56) References Cited

U.S. PATENT DOCUMENTS 5,365,516 A 11/1994 Jandrell
5,455,851 A 10/1995 Chaco et al.
(Continued)

FOREIGN PATENT DOCUMENTS

CN 1841086 10/2006
CN 1841086 A 10/2006
(Continued)

OTHER PUBLICATIONS

First Office Action from Chinese Patent Application No. 201720524582. 2, dated Nov. 20, 2017, 3 pages.
(Continued)

*Primary Examiner* — Yuwen Pan
*Assistant Examiner* — Umair Ahsan
(74) *Attorney, Agent, or Firm* — Westman, Champlin & Koehler, P.A.

(57) ABSTRACT

A positioning system, includes a plurality of anchor stations each configured to transmit a radio frequency signal. A mobile station includes a radio frequency transceiver configured to transmit and receive a radio frequency signal from at least one of the plurality of anchor stations. A processing unit is configured to determine position information of the mobile unit based upon the transmitted and received radio frequency signal. Another positioning system uses a number of beacons ranging a number of mobile tags with ultra-wide band ranging, and communicating wirelessly with an application server.

34 Claims, 3 Drawing Sheets

Related U.S. Application Data (60) Provisional application No. 62/335,192, filed on May 12, 2016, provisional application No. 61/946,987, filed on Mar. 3, 2014.

(51) Int. Cl.

| | | |
|---|---|---|
| *G01S 5/14* | (2006.01) | |
| *G01S 5/02* | (2010.01) | |
| *G01S 13/76* | (2006.01) | |
| *G01S 13/87* | (2006.01) | |
| *G01C 21/20* | (2006.01) | |

(52) U.S. Cl.
CPC .......... *G01S 13/765* (2013.01); *G01S 13/878* (2013.01); *H04W 56/0015* (2013.01); *G01C 21/206* (2013.01)

(58) Field of Classification Search
CPC .... H04W 4/02; G01S 15/66; G01S 2015/465; G01S 1/02; G01S 1/022; G01S 1/024; G01S 1/04; G01S 1/042; G01S 1/045; G01S 1/24; G01S 1/72; G01S 1/725
See application file for complete search history.

(56) References Cited

U.S. PATENT DOCUMENTS

| | | | |
|---|---|---|---|
| 5,491,670 A | 1/1996 | Weber | |
| 5,526,357 A | 6/1996 | Jandrell | |
| 5,544,171 A * | 8/1996 | Godecker | H04B 7/2609 370/337 |
| 6,292,106 B1 | 9/2001 | Solinsky et al. | |
| 6,492,906 B1 * | 12/2002 | Richards | G01S 13/42 340/573.1 |
| 7,423,576 B2 | 9/2008 | Sahinoglu et al. | |
| 7,463,194 B1 | 12/2008 | Sahinoglu | |
| 7,463,617 B2 | 12/2008 | Lamance et al. | |
| 7,539,779 B2 | 5/2009 | Ha et al. | |
| 7,932,858 B2 | 4/2011 | Laine et al. | |
| 7,995,644 B2 | 8/2011 | Sahinoglu et al. | |
| 8,130,141 B2 | 3/2012 | Pattabiraman et al. | |
| 8,175,613 B2 | 5/2012 | Patil et al. | |
| 8,203,910 B2 | 6/2012 | Zhao et al. | |
| 8,484,704 B2 | 7/2013 | Chavez et al. | |
| 8,766,794 B2 | 7/2014 | Ferguson et al. | |
| 8,773,309 B2 | 7/2014 | Kawaguchi et al. | |
| 8,792,387 B2 | 7/2014 | Georgis et al. | |
| 8,811,199 B2 | 8/2014 | Nixon et al. | |
| 8,837,307 B2 | 9/2014 | Ekbal et al. | |
| 8,912,949 B2 | 12/2014 | Hirata et al. | |
| 9,014,181 B2 | 4/2015 | Lakshman et al. | |
| 9,397,817 B2 | 7/2016 | Park | |
| 9,557,402 B2 | 1/2017 | Bartov et al. | |
| 2005/0002481 A1 | 1/2005 | Woo et al. | |
| 2006/0029009 A1 | 2/2006 | Alapuranen et al. | |
| 2006/0133556 A1 | 6/2006 | Sarkar | |
| 2007/0162185 A1 | 7/2007 | McFarland | |
| 2008/0018521 A1 | 1/2008 | Sahinoglu et al. | |
| 2008/0032705 A1 | 2/2008 | Patel et al. | |
| 2009/0070797 A1 * | 3/2009 | Ramaswamy | H04L 12/66 725/10 |
| 2009/0190441 A1 | 7/2009 | Zhao et al. | |
| 2009/0201850 A1 | 8/2009 | Davis et al. | |
| 2009/0295639 A1 * | 12/2009 | Zhao | G01S 5/30 342/387 |
| 2010/0109849 A1 | 5/2010 | Wang et al. | |
| 2010/0172339 A1 | 7/2010 | Duan et al. | |
| 2010/0278060 A1 | 11/2010 | Lee et al. | |
| 2010/0290359 A1 | 11/2010 | Dewey et al. | |
| 2011/0110242 A1 * | 5/2011 | Nixon | H04W 64/00 370/252 |
| 2012/0087272 A1 | 4/2012 | Lemkin et al. | |
| 2013/0050080 A1 | 2/2013 | Dahl | |
| 2013/0057434 A1 | 3/2013 | Krasner et al. | |
| 2013/0057436 A1 | 3/2013 | Krasner et al. | |
| 2014/0253388 A1 | 9/2014 | Jalali et al. | |
| 2015/0091702 A1 * | 4/2015 | Gupta | G06K 7/10207 340/10.4 |
| 2015/0234033 A1 | 8/2015 | Jamieson | |
| 2015/0247916 A1 | 9/2015 | Bartov et al. | |
| 2015/0268327 A1 | 9/2015 | Neukirch | |
| 2017/0131383 A1 | 5/2017 | Bartov et al. | |

FOREIGN PATENT DOCUMENTS

| | | |
|---|---|---|
| CN | 1963561 | 5/2007 |
| CN | 101498781 | 8/2009 |
| CN | 101526601 | 9/2009 |
| CN | 101592727 | 12/2009 |
| CN | 102204396 | 9/2011 |
| CN | 102714855 | 10/2012 |
| CN | 103648164 | 3/2014 |
| CN | 103947280 | 7/2014 |
| CN | 204439827 | 7/2015 |
| CN | 104898090 | 9/2015 |
| EP | 1992964 A2 | 11/2008 |
| EP | 1992964 A3 | 2/2011 |
| JP | 05-297117 H | 11/1993 |
| JP | H07-502153 | 3/1995 |
| JP | 2006-507500 | 3/2006 |
| JP | 2007-501383 | 1/2007 |
| JP | 2008-026310 | 2/2008 |
| JP | 2009-505060 | 2/2009 |
| JP | 2009288245 A | 12/2009 |
| JP | 2010-175535 | 8/2010 |
| JP | 2010-204028 | 9/2010 |
| JP | 2010-213279 | 9/2010 |
| JP | 2011-080946 | 4/2011 |
| JP | 2011-232043 | 11/2011 |
| JP | 2013-510307 | 3/2013 |
| JP | 2013-533956 | 8/2013 |
| JP | 2013-195405 | 9/2013 |
| KR | 2003-0000582 | 1/2003 |
| KR | 2006-0092984 | 8/2006 |
| KR | 2011-0030404 | 3/2011 |
| RU | 2008 119 347 | 11/2009 |
| RU | 2 383 898 | 3/2010 |
| RU | 2011 120 814 | 11/2012 |
| WO | 9304453 A1 | 3/1993 |
| WO | WO 01/73710 | 10/2001 |
| WO | WO 2008/065691 | 6/2008 |
| WO | WO 2015/047986 | 4/2015 |
| WO | WO 2015/134269 | 9/2015 |

OTHER PUBLICATIONS

First Office Action from Chinese Patent Application No. 201720524635.0, dated Nov. 20, 2017, 2 pages.

Communication pursuant to Rules 161(1) and 162 EPC from European Application No. 15709589.4, dated Nov. 10, 2016, 2 pages.

Notification of Transmittal of the International Search Report and the Written Opinion of the International Searching Report Authority from PCT/US2015/017720, dated Oct. 7, 2015.

"The Cricket Location-Support System", by Nissanka Priyantha et al., Proceedings of the 6th Annual International Conference on Mobile Computing and Networking, Aug. 2000.

"An Advertising Supplement to Control Wired & Wireless HART Communication", Putman Media, Sep. 2013.

Invitation to Pay Additional Fees and, Where Applicable, Protest Fee and Partial International Search, from PCT/US2015/017720, dated Jun. 9, 2015.

Office Action from Chinese Patent Application No. 201410738708.7, dated Jan. 10, 2017.

Office Action from U.S. Appl. No. 14/493,730, dated Feb. 16, 2016.

Office Action from U.S. Appl. No. 14/493,730, dated Jun. 23, 2016.

Office Action from Chinese Patent Application No. 201720524582.2, dated Mar. 14, 2018.

Office Action from Japanese Patent Application No. 2016-555495, dated Mar. 22, 2018.

(56) References Cited

OTHER PUBLICATIONS

Office Action from Chinese Patent Application No. 201410738708.7, dated Mar. 30, 2018.
International Search Report and Written Opinion from International Patent Application No. PCT/US2017/030508, dated Dec. 20, 2017, 19 pages.
Second Office Action from Chinese Patent Application No. 201410738708.7, dated Sep. 13, 2017, 16 pages.
Rejection Notice from Japanese Patent Application No. 2016-555495, dated Aug. 2, 2017, 10 pages.
Invitation to Pay Additional Fees from PCT/US2017/030508, dated Aug. 24, 2017, 12 pages.
Notification of Transmittal of the International Search Report and the Written Opinion of the International Searching Authority from PCT/US2017/030512, dated Sep. 8, 2017, 13 pages.
Priyantha et al, "The Cricket Location-Support System", Proceedings of the Sixth Annual ACM/IEEE International on Conference Mobile Computing and Networking, pp. 32-43, dated Aug. 1, 2000, 12 pages.
"Wireless Medium Access Control (MAC) and Physical Layer (PHY) Specifications for Low-Rate Wireless Person Area Networks (LR-WPANS)", IEEE Stand for Information Technology—Telecommunications and Information Exchange Between Systems—Local and Metropolitan Area Networks—Specific Requirements, dated Jan. 1, 2003, 13 pages.
"Low-Rate Wireless Personal Area Networks (LR-WPANs)", IEEE Standard for Local and Metropolitan Area Networks, 802.15.4-2011, 1-314, dated Sep. 5, 2011, 314 pages.
Office Action from U.S. Appl. No. 15/416,004, dated Jul. 24, 2018.
Office Action from Japanese Patent Application No. 2016-555495, dated Oct. 17, 2018.
Communication from European Patent Application No. 17733198.0, dated Dec. 12, 2018.
Communication from European Patent Application No. 17722963.0, dated Dec. 19, 2018.
Reexamination Notification from Chinese Patent Application No. 201710738708.7, dated Jan. 15, 2019.
Communication from European Patent Application No. 115709589.4, dated Feb. 19, 2019.
First Examination Report from Indian Patent Application No. 201627027925, dated Mar. 28, 2019.
Office Action from U.S. Appl. No. 15/416,004, dated Apr. 4, 2019.
Office Action from Chinese Patent Application No. 201410738708.7, dated May 8, 2019.
Office Action from Russian Patent Application No. 2018143828, dated Aug. 9, 2019.
Examination Report from Australian Application No. 2017262492, dated Sep. 16, 2019.
Office Action from Chinese Patent Application No. 201710332366.2, dated Sep. 18, 2019.
Office Action from Canadian Patent Application No. 3,023,494, dated Oct. 16, 2019.
Office Action from Japanese Patent Application No. 2016-555495, dated Oct. 23, 2019.
Examination Report No. 1 from Australian Patent Application No. 2017262491, dated May 1, 2019.
Office Action from U.S. Appl. No. 15/416,004, dated Sep. 19, 2019.
Office Action from Japanese Patent Application No. 2018-559825, dated Feb. 4, 2020.
Office Action from Indian Patent Application No. 201827041700, dated Jul. 19, 2020.
Office Action from Korean Patent Application No. 10-2018-7033848, dated Mar. 10, 2020.
"Wireless Medium Access Control (MAC) and Physical Layer (PHY) Specifications for Low-Rate Wireless Person Area Networks (LR-WPANs)", IEEE Stand for Information Technology—Telecommunications and Information Exchange Between Systems—Local and Metropolitan Area Networks—Specific Requirements, dated Jan. 1, 2003, 680 pages.
Office Action from Canadian Patent Application No. 3,023,588, dated Nov. 7, 2019.
Office Action from Chinese Patent Application No. 201710332471.6, dated Nov. 12, 2019.
Office Action from Russian Patent Application No. 2018143829, dated Mar. 6, 2019.
Office Action from European Patent Application No. 17722963.0, dated Dec. 19, 2018.
Office Action from Japanese Application No. 2018-559835, dated Feb. 12, 2020.
Office Action from Korean Patent Application No. 10-2018-2017033408, dated Mar. 24, 2020.
Notification of Transmittal of the International Search Report and the Written Opinion of the International Searching Authority from International Application No. PCT/US2019/051474, dated Nov. 25, 2019.
Office Action from Canadian Patent Application No. 3,023,588, dated Aug. 4, 2020.
Examination Report No. 2 from Australian Patent Application No. 2017262491, dated Feb. 6, 2020.
Notice of Reasons for Rejection from Japanese Patent Application No. 2018-559825, dated Oct. 26, 2020.
Office Action from U.S. Appl. No. 15/416,004, dated May 21, 2020.
Examination Report from Australian Patent Application No. 2017262492, dated Jun. 12, 2020.
Examination Report from Australian Patent Application No. 2017262492, dated Sep. 9, 2020.
Office Action from Chinese Patent Application No. 201710332366.2, dated Jul. 31, 2020.
Examination Report from Indian Patent Application No. 201827041343, dated Aug. 24, 2020.
Communication from European Patent Application No. 17733198.0, dated Sep. 1, 2020.
Office Action from Chinese Patent Application No. 201710332471.6, dated Jun. 19, 2020.
KIPO Refusal Decision from Korean Patent Application No. 10-2018-7033848, dated Dec. 16, 2020.
Office Action from Chinese Patent Application No. 201710332366.2, dated Feb. 3, 2021.
Office Action from Mexican Patent Application No. MX/a/2018/013722, dated Dec. 9, 2020.

* cited by examiner

POSITIONING SYSTEM

CROSS-REFERENCE TO RELATED APPLICATION

The present application is based on and claims the benefit of U.S. provisional patent application Ser. No. 62/335,192, filed May 12, 2016; the present application is also a Continuation-in-Part of U.S. Ser. No. 14/493,730, filed Sep. 23, 2014, which claims priority to U.S. provisional patent application Ser. No. 61/946,987, filed Mar. 3, 2014, the contents of which are hereby incorporated by reference in their entirety.

BACKGROUND

The present disclosure relates to positioning systems. More specifically, the present disclosure relates to systems used to identify the locations of or track objects in a given area.

A Positioning System (PS) is a network of devices used to wirelessly locate objects or people inside a building or within dense industrial areas. A special design is required since global positioning system (GPS) systems are typically not suitable to establish indoor locations or other crowded locations as they require an unobstructed line of sight to four or more GPS satellites. Microwaves will be attenuated and scattered by roofs, walls and other objects and multiple reflections at surfaces cause multipath propagation serving for uncontrollable errors.

Time of flight (ToF) is the amount of time a signal takes to propagate from transmitter to receiver. Because the signal propagation rate is constant and known, the travel time of a signal can be used directly to calculate distance. Multiple (in GPS at least four satellites) measurements vs. multiple anchor stations can be combined with trilateration to find a location.

As speed of light is $3 \times 10^8$ m/sec, in radio frequency (RF) based systems, inaccuracy in clock synchronization is a key factor of the positioning error. In GPS, ToF generally requires a complicated synchronization mechanism to maintain a reliable source of time for sensors.

In addition, the accuracy of the ToF based methods often suffer from large multipath conditions in localization situations with dense populations, such as indoor locations and industrial environments which can be crowded, which is caused by the reflection and diffraction of the RF signal from objects.

Due to the attenuation and reflections caused by construction materials, it is desirable to have an unobstructed line of sight to at least three anchor points at any location that should be covered by the system. As a result, a larger number of anchor stations are required.

SUMMARY

A positioning system according to one embodiment includes a plurality of anchor stations each configured to transmit and receive a radio frequency signal. A mobile station includes a radio frequency transceiver configured to transmit and receive a radio frequency signal from at least one of the plurality of anchor stations. A processing unit is configured to determine position information of the mobile unit based upon the transmitted and received radio frequency signal.

A positioning system according to another embodiment includes a plurality of beacons, each of which are at least partially battery powered and are configured for wireless communication. An application server is configured to communicate wirelessly with the beacons based on a communication standard.

A method embodiment of determining a position of a mobile tag in a system comprising an application server and a plurality of fixed location beacons includes connecting the plurality of beacons and the application server with a wireless communication network. A plurality of time slots is assigned at the application server for two way ranging operations between a beacon of the plurality of beacons and the mobile tag. The mobile tag is ranged with respect to at least three beacons of the plurality of beacons. Mobile tag information is transferred from the plurality of beacons to the application server.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION OF ILLUSTRATIVE EMBODIMENTS

Figure 1:
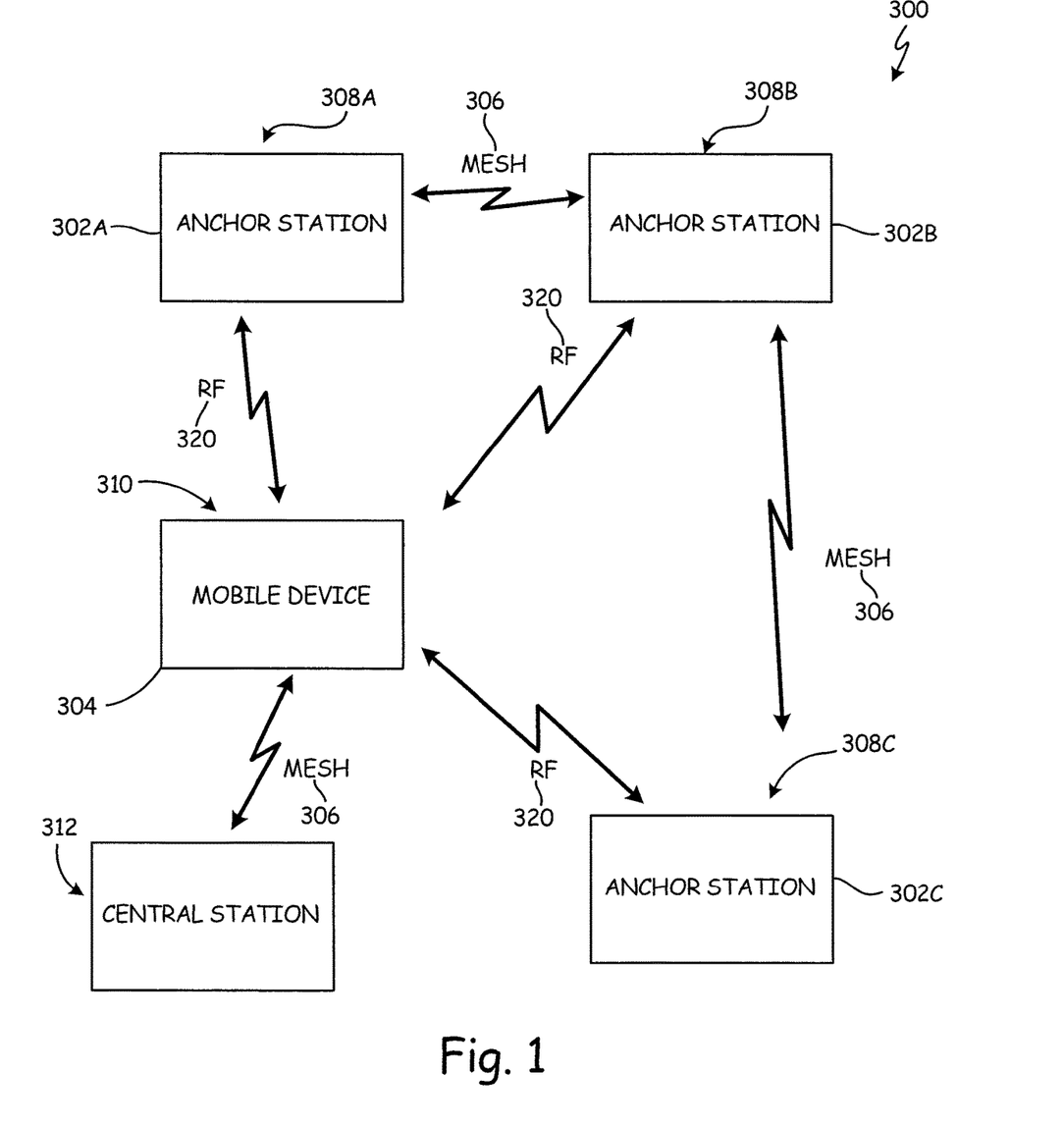
FIG. 1 shows a block diagram of a positioning system in accordance with one embodiment of the present disclosure.

In one specific configuration, the system is based on a commercially proved industrial mesh network such as WirelessHART® network (IEC 62591), and is shown in block diagram form in FIG. 1.

FIG. 1 shows a system 300 having plurality of anchor stations (or "beacons") 302 (three anchor stations 302A, 302B, and 302C shown in FIG. 3, and described in greater detail below) which are disposed in known positions, and a mobile station (also called a "tag", "portable unit" or PU") 304 (described in greater detail below) for which a position 310 is desired to be determined. Anchor stations 302 are in one embodiment part of a wireless network mesh 306 such as a WirelessHART® network. In operation, the plurality of anchor stations 302 are positioned at known locations 308A, 308B, and 308C around an area to be monitored. A mobile station 304 is located on or in close proximity to an object for which the position 310 is desired to be known. The object may be, by way of example only and not by way of limitation, a piece of inventory or a person.

In one embodiment as shown in FIG. 1, to determine a distance from an anchor station 302 to the mobile station 304, the anchor station 302 transmits an RE message 320 (i.e., a WirelessHART® message). As discussed below, WirelessHART® signals allow for synchronization as they may contain synchronization information, and allow for transmission of data as well as is known in the art. Using this synchronization and data transmission capability allows the RF pulse to be used as a unique synchronization pulse, so that it is possible to know which anchor station 302 or mobile station 304 is transmitting in addition to when the transmission is made. The time difference between transmission of the RF pulse and receipt of a response allows for a determination of the distance between the mobile station and the transmitting anchor station 302. A location for the mobile station may be determined using distance calculations from three separate anchor stations, for example using trilateration.

TDMA is a known standard for sharing a frequency channel on a network, by dividing the signal into multiple time slots. Each station, such as anchor stations 302 described herein, may share the frequency being used for pulses by being assigned a specific time slot for transmissions. In one embodiment, a central station 312, having received information from one or more mobile stations 304 regarding its/their position(s), uses the determined positions to adjust time slotting within TDMA. The central station 312 is used in the system 300, and is connected with the mesh 306 to receive information from one or more mobile stations 304. Time slots for anchor stations 302 are assigned by the central station 312. Any appropriate communication technique may be employed including CDMA techniques or other time and/or frequency slotting or sharing techniques. Alternatively or in addition, the anchor stations 302 may communicate directly with the central station 312.

In one embodiment, location information for one or more mobile stations 304 is used to adjust time slots for the various anchor stations. For example, when a position 310 of a mobile station is closer to some anchor stations 302 than others, the time slots for those anchor stations 302 at a greater distance may be expanded, allowing for pulse propagation and receipt without overlap from other anchor stations 302 due to distance. The central station 312 in one embodiment monitors distances from each line of sight anchor station 302 to each mobile station 304, and adjusts the time slots for the anchor stations according to expected propagation times, to reduce crosstalk between anchor stations 302. Further, pulse coding and different frequencies including spread spectrum techniques may also be used to reduce crosstalk between close anchor stations 302 or other anchor stations.

Figure 2:
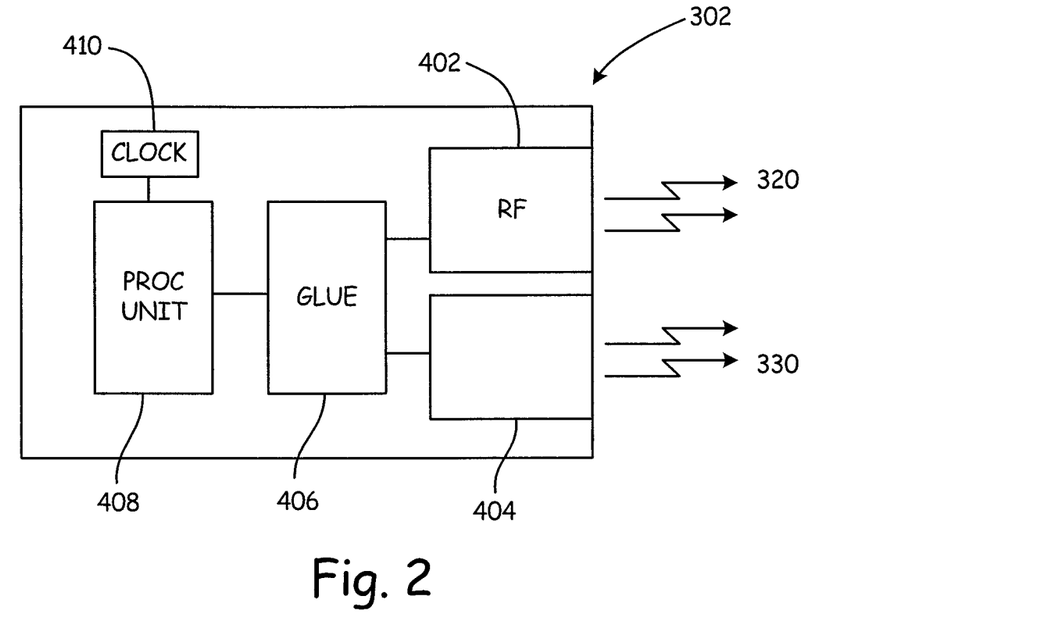
FIG. 2 is a block diagram of an anchor station in accordance with one embodiment of the present disclosure.

The anchor system stations 302 are all registered devices on the network 300, so each anchor point 302 is a WirelessHART® device with an RF transmitter 402. In addition, the anchor station 302 contains an optional communication module 404 that may communicate using communication signals 330, and some glue logic 406.

Details of an anchor station 302 are shown in FIG. 2. Each anchor station 302 includes in one embodiment an RF transmitter (i.e., WirelessHART®) 402, communication module 404, glue logic 406 to allow interface between various more complex logic circuits such as the RF transmitter 402 and communication module 404, a processing unit 408, or the like within the anchor station 302, and a clock 410. Glue logic 406 is known in the art and will not be described further herein. Also, WirelessHART® is a known standard for wireless sensor networking based on the Highway Addressable Remote Transducer (HART®) Protocol. In one embodiment, the anchor stations 302 are part of a mesh network of devices, such that each anchor station 302 is a WirelessHART® device on the wireless mesh network 306. Clock 410 is operatively coupled in one embodiment to processing unit 406 to allow processing unit 406 to determine a time of transmission of signals such as RF signal 320. In another embodiment, clock 410 may be a part of processing unit 406.

Figure 3:
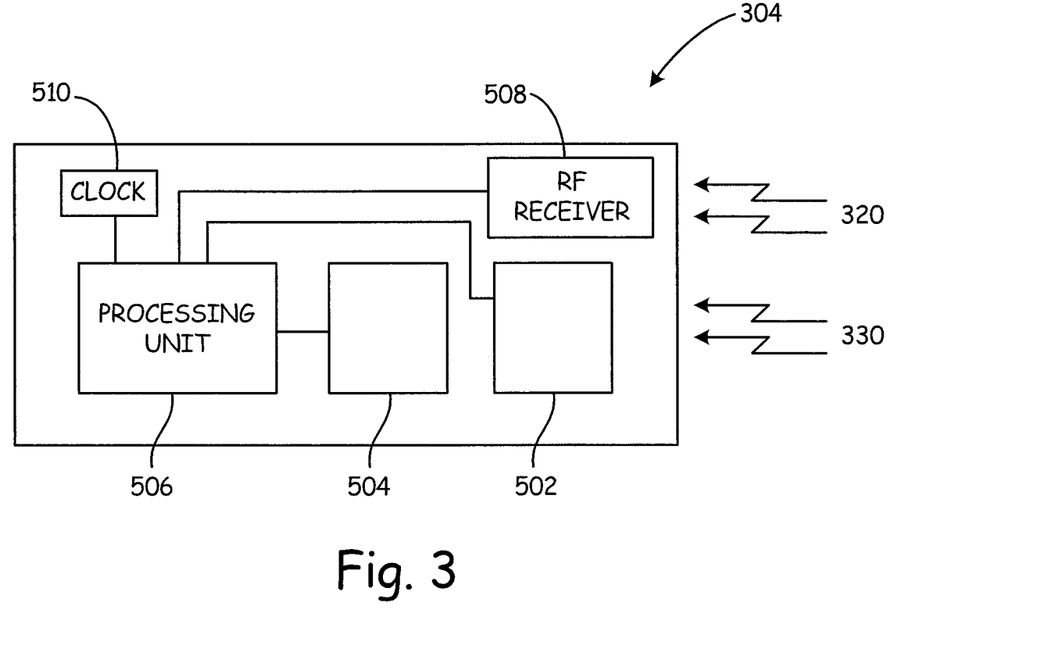
FIG. 3 is a block diagram of a mobile station in accordance with one embodiment of the present disclosure.

As illustrated in FIG. 3, in one configuration, the mobile station 304 is also a WirelessHART® device with an optional communication unit 502, optional GPS unit 504, a small processing unit 506, and an RF receiver 508.

The mobile station 304 includes in one embodiment an optional communication module 502, an optional GPS unit 504 for use in outdoor locations, a processing unit 506, an RF receiver 508, and a clock 510. RF receiver 508 is operatively coupled to processing unit 506. Clock 510 is operatively coupled in one embodiment to processing unit 506 to allow processing unit 506 to determine a time of receipt of signals such as RF signal 320. In another embodiment, clock 510 may be a part of processing unit 506.

In order to calculate its positioning, the mobile station 304 measures the distance to at least three anchor stations 302. Three anchor stations 302 allow for adequate determination of position, for example by trilateration, for a mobile station 304 that is in the line of sight of each of the anchor stations 302, but in case there are more anchor points 302 in the area, the redundancy can be used to improve the robustness of the measurement. While three anchor stations 302 (respectively, 302A, 302B, and 302C) are shown in FIG. 3, it should be understood that for complete coverage of an area, additional anchor stations may be used to increase the accuracy of position 310 determination, and to provide more potential line of sight options for all parts of the area to be covered by the system 300. Further, while one mobile station 304 is shown, multiple mobile stations 304 may be disposed within the area to be monitored, and the system 300 may use the same plurality of anchor stations 302 transmitting RF signals to determine multiple locations 310 of multiple mobile stations 304. The mobile station 304 reports the acquired information to a central station 312 via the network 306. The central station 312 may run an algorithm that optimizes the TDMA time slots according the current positions 310 of mobile stations 304 and may modify the network parameters accordingly. Within the mesh network, since locations of anchor stations 302 may be transmitted over the network, anchor stations 302, mobile stations 304 or the central station 312 may, in various embodiments, make a determination of the position of a mobile station 304.

In some situations, position of a mobile station may be determined using fewer than three anchor stations. Such a situation includes by way of example, but is not limited to, where there is some external information known about the mobile station, such as that it is located in a corridor or other known confined area, or where other tracking information is known for the mobile station. In such situations, position may be determined using as few as one anchor station.

A positioning system (PS) is provided in one embodiment in which a network of devices is used to wirelessly locate objects or people inside a building or within dense industrial areas. A system embodiment is provided that does not necessarily rely on GPS for location determination. Further, microwaves will be attenuated and scattered by roofs, walls and other objects especially in an indoor environment. Still further, multiple reflections at surfaces can cause multi-path propagation resulting in uncontrollable errors.

Figure 4:
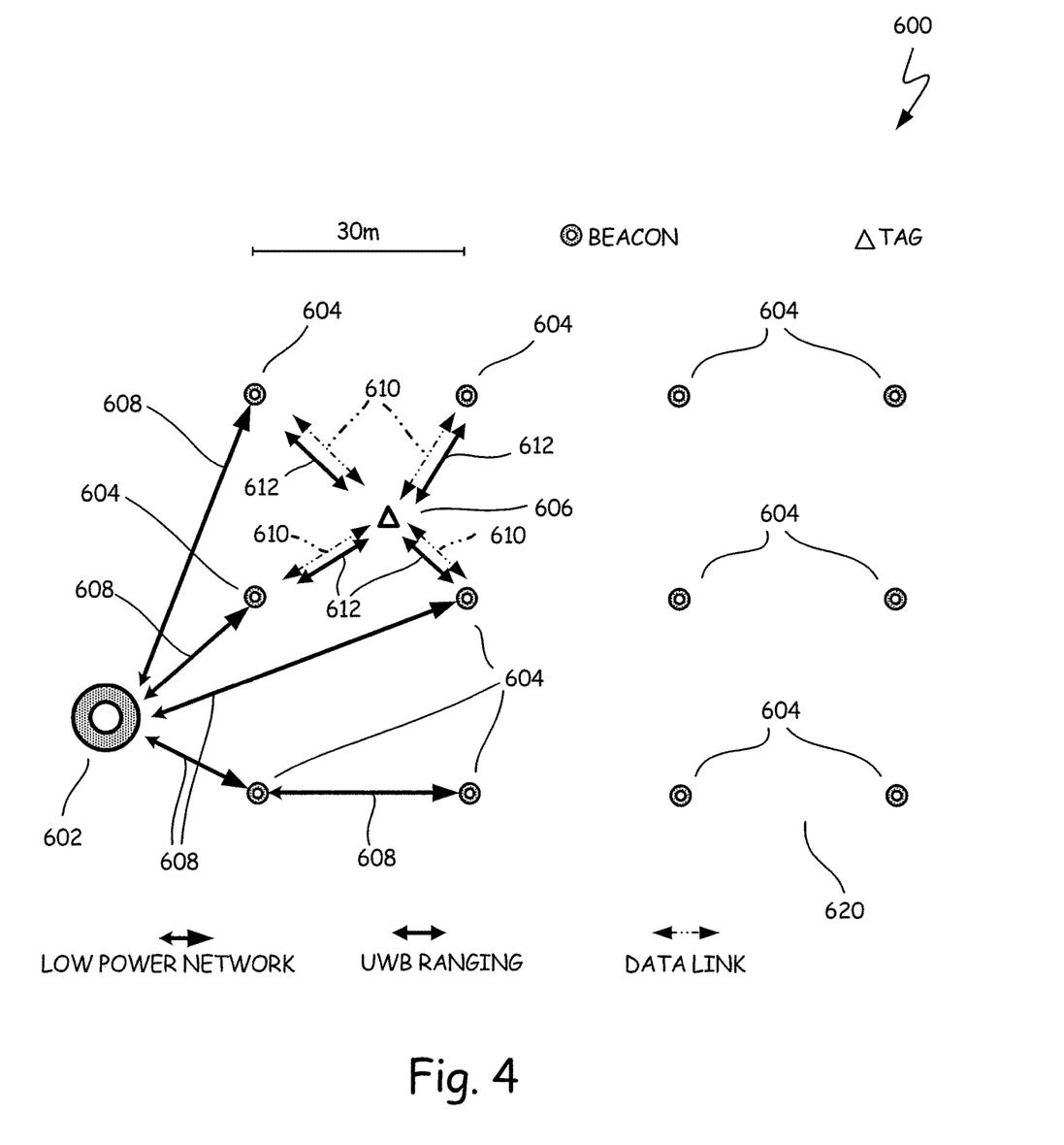
FIG. 4 is a block diagram showing a central location, anchor stations and a mobile station.

An embodiment 600 of a PS using ultra-wide band communication between beacons and tags of a system is shown in block diagram in FIG. 4. PS 600 comprises in one embodiment an application server 602, a plurality of beacons 604, and at least one mobile tag 606. In this embodiment, a tag 606 is a portable component that can be attached to or otherwise carried by persons or equipment that is to be tracked by the system 600. A beacon 604 is a fixed position, static anchor placed at a predefined coordinate of a positioning arena or area 620. In one embodiment, a plurality of beacons 604, arranged in an array such as that shown in FIG.

4, are positioned in the arena 620 to allow for all locations within the arena 620 to be visible by more than one beacon 604, and preferably by at least three beacons 604. Under some conditions, range measurements from the tag to at least three beacons 604 will provide enough information to determine a position of the tag 606 within the arena 620.

The application server 602 in one embodiment prepares and sends setup and configuration information to the beacons 604. The application server 602 also in one embodiment receives and processes position information for the tag 606, and other information from the beacons 604, for the purpose of displaying the position of the tag 606 to an end user, for archiving, or for any other further analysis. While one tag 606 is shown, it should be understood that many tags 606 may be at positions within the arena 620. The application server 602, in conjunction with the beacons 604, is used in one embodiment to monitor the positions of a plurality of tags 606 within the arena 620. The application server 602 in one embodiment communicates with the beacons 604 via a low power network as indicated in lines 608, described further below.

The beacons 604 communicate with tag 606 in one embodiment along data links illustrated as lines 610 using Ultra-Wide Band (UWB) technology as indicated at by UWB ranging signal lines 612. UWB offers the potential of achieving high ranging accuracy through signal time of arrival (TOA) measurements, even in harsh environments, due to its ability to resolve multipath signals and to penetrate obstacles. For example, information related to a separation distance between a pair of nodes A and B in a UWB network can be obtained using measurements of signal propagation delay, or time-of flight (TOF) $T_f=d/c$, where d is the actual distance between the two nodes and c is the speed of electromagnetic waves (c~3*10$^8$ m/s). Nodes A and B in various embodiments may be multiple beacons 604, or a beacon 604 and a tag 606, or multiple tags 606. In one embodiment, tags 606 are beacons dedicated to being mobile position locators.

The IEEE 802.15.4a-2011 standard is the first UWB-based standard for low-rate wireless networks with localization capability. However, other ultra-wide band communication techniques may also be employed.

For example, assume a first node A transmits to a second receiving node B a packet that contains the timestamp $t_1$ at which A's packet was sent. Node B receives the packet at time $t_2$. Under ideal conditions, that is, when node clocks of nodes A and B are perfectly synchronized to a common time reference, time of flight ($T_f$) can be determined at node B as $T_f=t_2-t_1$. The distance between nodes A and B can be estimated in this one-way ranging using $T_f$. One-way ranging, however, requires very accurate synchronization between nodes that is very difficult to maintain with low cost electronics. For example, a relatively small 10 nsec synchronization error between nodes A and B will yield a 3 meter ranging error.

In practice, TOF estimation is often done with two-way ranging (TWR) (without a common time reference). In TWR, node A transmits a packet to node B, which replies by transmitting an acknowledgment packet to node A after a response delay $T_d$. The round trip time (RTT) at node A is determined by $T_{RT}=2T_f+T_d$, from which the distance can be estimated assuming $T_d$ is known. Knowing $T_d$ and $T_{RT}$ allows calculation of $T_f$.

By definition, UWB (IEEE 802.15.4a-2011 based) TWR sequencing is done between two nodes. Theoretically, (according to the standard), the number of measurement that can be done in parallel (on the same channel) without crosstalk is limited to 2 or 4 depending on the channel.

Due to the attenuation and reflections in some environments, such as those caused by construction materials and the like, it is desirable to have an unobstructed line of sight from a mobile beacon (such as a tag 606) to at least 3 beacons (such as beacons 604) when the mobile beacon/tag is at any location that should be covered by the system 600. As a result, a large number of beacons 604 may be used.

Use of a large number of beacons 604 may put restrictions on the cost of installation of the beacons 604. It is therefore desirable that the beacons 604 be at least partially battery powered, and that the communication (such as on a low power network 608) from beacons 604 to the application server 602 be wireless. In some embodiments, beacons may use other forms of energy, such as that harvested in known ways, for at least a part of their power.

A PS such as system 600 may also employ thousands of tags for determining the positions of items and/or personnel. For positioning updates (according to the system 600's or the tag 606's specific update rate), each of the tags 606 should be involved in at least three TWR sequences with beacons 604 in order to be able to estimate its current position. In general, the measurement rate is a multiplication of the number of tags 606, the measurements per tag 606, and the update rate.

A TWR round trip time is typically on the order of 1 millisecond. For a system with thousands of tags 606 and an update rate on the order of few to tens of seconds, that means that coordination of the TWR measurement is carefully controlled to allow a high number of TWR measurements without crosstalk.

In one embodiment, in a TWR, node B is armed, waiting for a poll from node A. In order to preserve battery life on node B (either tag or beacon), it is desirable that node B will start listening just before system A is about to send the poll. In one embodiment, an application server such as application server 602 sends scheduling information to the beacons 604, such as to node B, so that the beacons 604 are activated for listening just in time before transfer of a poll. In one embodiment, this is done over the IEEE 802.15.4-2003 compliant network.

Another function of the PS 600 is to continuously transfer information from the beacons 604 to the central application station 602. The data transferred between the beacons 604 and the central application station 602 might be either the raw ranging measurements or the calculated position of a tag 606 (depending on the configuration of the system 600). The information about raw measurements, such as TWR measurements and the like, is in one embodiment, done over the IEEE 802.15.4-2003 compliant network.

IEEE 802.15.4-2003 deals with low data rate but very long battery life (months or even years) and very low complexity. The standard defines both the physical (Layer 1) and data-link (Layer 2) layers of an open system interconnection (OSI) model. The first edition of the 802.15.4 standard was released in May 2003. Several standardized and proprietary networks (or mesh) layer protocols run over 802.15.4-based networks, including IEEE 802.15.5, ZigBee, 6LoWPAN, WirelessHART®, and ISA100.11a.

FIG. 4 is a diagram showing communication between an application server 602, beacons 604, and a portable tag 606. In one embodiment, a wireless network such as a WirelessHART® network is used as a backbone for the positioning system that uses UWB (e.g., IEEE 802.15.4a-2011) for range measurements. The low power network used to communicate with beacons 604 is illustrated at 608, along with the ultra-wide band ranging signal 612 and the data link 610 between a tag 606 and one or more beacons 604. In the example illustrated, beacons 604 are distributed across the facility (e.g., the arena 620) with a spacing of approximately 30 meters.

Although the present disclosure has been described with reference to preferred embodiments, workers skilled in the art will recognize that changes may be made in faun and detail without departing from the spirit and scope of the disclosure. Embodiments of the present disclosure can be used in indoor, outdoor or hybrid environments. Communication can be in accordance with any standard and is not limited to a mesh network type communication system. The term "RF" refers to radio frequency of any appropriate wavelength. As used herein, the term "anchor" refers to a base transmitter whose location is known and is used as a reference location in determining location. The term "mobile device" refers to the device, such as a mobile station, whose location is being identified. The processing unit which is used to determine location may reside in the mobile station, in one or more of the anchor stations, at a central station, or at some other location.

An optional GPS module such as module 504 shown above, may be provided in a mobile station (such as a tag 606) and may be used when a GPS signal is available. A low power communication protocol (i.e., 608) such as those based on the IEEE 802.15.4-2003 physical layer may be used as a backbone for a positioning system that uses robust ranging achieved through the use of a low power UWB ranging and communications protocol such as those based on IEEE 802.15.4a-2011. However, other ranging and communication protocols and techniques may be used to implement the embodiments of the disclosure. The configuration provides accurate low power location detection that is substantially immune from multipath errors. Novel arbitration techniques allow location monitoring of many thousands of tags. The backhaul communication between beacons and the server preferably employs a low power communication technique such as WirelessHART®, ISA100, Zigbee® and Bluetooth® Low Energy, and LORA® based WAN, or others.

What is claimed is:

1. A positioning system, comprising:
    a plurality of beacons, each of which are at least partially battery powered and are configured for wireless communication, wherein the plurality of beacons comprises a plurality of fixed location beacons and at least one mobile beacon; and
    an application server configured to communicate wirelessly on a first network with the beacons based on a communication standard and to determine, assign, and transfer ranging time slots to the plurality of fixed location beacons for two way ranging measurements;
    wherein the at least one mobile beacon is configured to communicate with beacons of the plurality of fixed location beacons using a separate communication network from the first network, and wherein communication on the first network is bidirectional and transfers mobile tag information from the plurality of fixed location beacons to the application server;
    wherein the plurality of fixed location beacons and the at least one mobile beacon perform two-way ranging therebetween in the assigned ranging time slots by:
        ranging the at least one mobile beacon to at least a portion of the plurality of fixed location beacons during the assigned ranging time slots; and
        reporting a position of the at least one mobile beacon to at least a beacon of the plurality of fixed location beacons; and
        adjusting, by the application server, the plurality of time slots for the plurality of fixed location beacons based on a determined location of the at least one mobile beacon relative to each of the plurality of fixed location beacons.

2. The positioning system of claim 1, wherein the communication standard comprises an IEEE 802.15.4-2003 compliant protocol network.

3. The positioning system of claim 1, wherein the communication standard comprises WirelessHART®.

4. The positioning system of claim 1, and further comprising:
    a tag configured to communicate with the plurality of beacons, wherein ranging between the tag and the plurality of beacons is based on ultra-wide band (UWB) technology.

5. The positioning system of claim 4, wherein the UWB technology is compliant with a communication standard.

6. The positioning system of claim 5, wherein the communication standard is an IEEE 802.15.4a-2011 compliant standard.

7. The positioning system of claim 1, and further comprising:
    a tag configured to perform time synchronization with the plurality of beacons, wherein time synchronization between the plurality of beacons and the tag is configured for two way ranging (TWR) between a beacon of the plurality of beacons and the tag.

8. The positioning system of claim 7, wherein coordination of TWR measurements between a beacon of the plurality of beacons and the tag is based on an inherent time synchronization mechanism of an IEEE 802.15.4-2003 compliant network.

9. The positioning system of claim 7, wherein the application server is configured to assign time slots for TWR measurements.

10. The positioning system of claim 7, wherein the application server is further configured assign time slots for TWR measurements between a beacon of the plurality of beacons and the tag, in which information that defines time slots for TWR between beacons and tags is transferred from the application server to the beacons via an IEEE 802.15.4-2003 compliant network.

11. The positioning system of claim 10, wherein the time slots for TWR measurements are assigned to prevent cross talk between multiple TWR measurements.

12. The positioning system of claim 1, wherein the application server is further configured to transfer information to the beacons to prepare for a TWR measurement just prior to an initiation of the TWR measurement.

13. The positioning system of claim 1, wherein the plurality of beacons are configured to transmit information related to raw TWR measurements the application server through an IEEE 802.15.4-2003 compliant network.

14. The positioning system of claim 1, wherein information related to a position of the tag is transferred from at least three of the plurality beacons to the application server through an IEEE 802.15.4-2003 compliant network.

15. The positioning system of claim 1, wherein the application server is further configured to transfer setup and configuration information for the plurality of beacons, including beacon positions, to the plurality of beacons through an IEEE 802.15.4-2003 compliant network.

16. The system of claim 1, wherein the application server is further configured to adjust the plurality of time slots for the plurality of beacons based on an expected propagation time between the beacons and the mobile tag.

17. The system of claim 1, wherein ranging between the at least one mobile beacon and the beacons of the plurality of beacons is based on ultra-wide band (UWB) technology.

18. A method of determining a position of a mobile tag in a system comprising an application server and a plurality of fixed location beacons, comprising:
connecting the plurality of beacons and the application server with a first wireless communication network;
assigning, at the application server, a plurality of time slots for two way ranging operations between a beacon of the plurality of beacons and the mobile tag that use a separate communication network from the first wireless communication network, and transferring the assigned plurality of time slots for two way ranging operations to the beacons on the first wireless communication network;
ranging the mobile tag with respect to at least three beacons of the plurality of beacons on the separate communication network during the assigned ranging time slots to determine the position of the mobile tag;
transferring mobile tag information from the plurality of beacons to the application server via the first wireless communication network; and
adjusting, by the application server, the plurality of time slots for the plurality of fixed location beacons based on a determined location of the mobile tag relative to each of the the plurality of fixed location beacons.

19. The method of claim 18, wherein ranging comprises:
transmitting from a beacon of the plurality of beacons a packet with a known transmit time; and
receiving at the beacon a return signal in response to receipt of the packet from the mobile tag.

20. The method of claim 18, wherein the wireless communication between the beacons to the application server is performed based on a communication standard.

21. The method of claim 20, wherein the communication is performed on an IEEE 802.15.4-2003 compliant protocol network.

22. The method of claim 20, wherein the communication is performed on a WirelessHART® network.

23. The method of claim 20, wherein the ranging between the tag and a beacon of the plurality of beacons is based on ultra-wide band (UWB) technology compliant with a communication standard.

24. The method of claim 18, wherein the ranging is performed over an IEEE 802.15.4a-2011 standard compliant network.

25. The method of claim 20, wherein time synchronization for the plurality of beacons and the tag for the coordination of ranging measurements is based on an inherent time synchronization mechanism of an IEEE 802.15.4-2003 compliant network.

26. The method of claim 25, wherein information that defines the plurality of time slots for ranging between the plurality of beacons and the tag prevents cross talks between multiple measurements.

27. The method of claim 26, wherein the information that defines the plurality of time slots is transferred from the application server to the plurality of beacons via an IEEE 802.15.4-2003 compliant network.

28. The method of claim 19, and further comprising:
instructing the plurality of beacons to initiate a sensing operation just prior to a poll being transferred to the plurality of beacons from the application server.

29. The method of claim 20, and further comprising transferring information that allows the plurality of beacons to begin listening just prior to a poll being transferred from the application server to the plurality of beacons.

30. The method of claim 20, and further comprising transferring information related to ranging measurements from the plurality of beacons to the application server through an IEEE 802.15.4-2003 compliant network.

31. The method of claim 20, and further comprising transferring information related to tag positions from the plurality of beacons to the application server through an IEEE 802.15.4-2003 compliant network.

32. The method of claim 20, and further comprising transferring remote setup and configuration information for the plurality of beacons including positions for the plurality of beacons from the application server to the plurality of beacons through an IEEE 802.15.4-2003 compliant network.

33. The method of claim 18, and further comprising adjusting the plurality of time slots for the plurality of beacons based on an expected propagation time between the beacons and the mobile tag.

34. The method of claim 33, wherein adjusting comprises expanding the time slots for those beacons having a larger expected propagation time, and contracting the time slots for those beacons having a smaller expected propagation time.

* * * * *